US010460611B2

(12) United States Patent
Kotecha (10) Patent No.: US 10,460,611 B2
(45) Date of Patent: *Oct. 29, 2019

(54) DYNAMIC NAVIGATION OF UAVS USING THREE DIMENSIONAL NETWORK COVERAGE INFORMATION

(71) Applicant: Verizon Patent and Licensing Inc., Arlington, VA (US)

(72) Inventor: Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/718,761

(22) Filed: Sep. 28, 2017

(65) Prior Publication Data

US 2018/0018883 A1  Jan. 18, 2018

Related U.S. Application Data

(63) Continuation of application No. 14/741,357, filed on Jun. 16, 2015, now Pat. No. 9,818,303.

(51) Int. Cl.
*G06Q 10/04* (2012.01)
*G08G 5/00* (2006.01)
*B64C 39/02* (2006.01)
*G01C 21/00* (2006.01)
*G01C 21/20* (2006.01)
*H04B 7/185* (2006.01)

(52) U.S. Cl.
CPC ......... *G08G 5/0034* (2013.01); *B64C 39/024* (2013.01); *G01C 21/005* (2013.01); *G01C 21/20* (2013.01); *G06Q 10/047* (2013.01); *G08G 5/0013* (2013.01); *G08G 5/0026* (2013.01); *H04B 7/18506* (2013.01); *B64C 2201/027* (2013.01); *B64C 2201/14* (2013.01)

(58) Field of Classification Search
CPC .. G08G 5/0034; G08G 5/0013; G08G 5/0026; B64C 39/024; B64C 2201/14; B64C 2201/027; G01C 21/005; G01C 21/20; H04B 7/18506; G06Q 10/047
See application file for complete search history.

(56) References Cited

U.S. PATENT DOCUMENTS

| 5,904,724 A * | 5/1999 | Margolin ............. G05D 1/0038 244/189 |
| 6,748,325 B1 * | 6/2004 | Fujisaki ................. G01C 21/00 701/301 |
| 2003/0125043 A1 * | 7/2003 | Silvester ............... H04W 4/024 455/456.1 |
| 2003/0229478 A1 * | 12/2003 | Rappaport ............ H04W 16/20 703/13 |

(Continued)

*Primary Examiner* — Stephen Holwerda (57) ABSTRACT

Flight path determination for unmanned aerial vehicles (UAVs) in which three-dimensional coverage information, corresponding to a wireless network, is used to optimize the flight path to ensure that the UAVs maintain network coverage throughout the flight. The flight path information may be provided as a service to UAV operators. In one implementation, network coverage for a network may be mapped in a three-dimensional manner. That is, the radio signal strength of the network may be mapped at various heights that correspond to heights at which UAVs are likely to fly.

20 Claims, 8 Drawing Sheets

(56) References Cited

U.S. PATENT DOCUMENTS

| | | | | |
|---|---|---|---|---|
| 2005/0143013 | A1* | 6/2005 | Jha | H04L 1/0001 |
| | | | | 455/69 |
| 2007/0253341 | A1* | 11/2007 | Atkinson | H04L 45/02 |
| | | | | 370/252 |
| 2010/0066566 | A1* | 3/2010 | Reusser | G01C 23/00 |
| | | | | 340/971 |
| 2010/0153001 | A1* | 6/2010 | Bauchot | G01C 21/3461 |
| | | | | 701/533 |
| 2013/0321424 | A1* | 12/2013 | Pylappan | G06T 11/00 |
| | | | | 345/440 |
| 2015/0336671 | A1* | 11/2015 | Winn | B64C 39/024 |
| | | | | 701/3 |

* cited by examiner

| Area ID | Height | Signal Strength | Network/Physical Parameters | Signal Strength Measurements |
|---|---|---|---|---|
| $A_1$ | 0 | 9 | <base station power levels>, <geographic topology>, <antenna orientation> | <signal strength = 9, mobile phone, May 19, 2015, 3pm> |
| $A_1$ | 100 | 5 | <base station power levels>, <geographic topology>, <antenna orientation> | <signal strength = 5, UAV, May 18, 2015, 1pm> |
| $A_1$ | 200 | 6 | <base station power levels>, <geographic topology>, <antenna orientation> | <no measurement> |
| $A_1$ | 300 | 6 | <base station power levels>, <geographic topology>, <antenna orientation> | <signal strength = 5, UAV, April 18, 2015, 1pm> |
| $A_2$ | 400 | 4 | <base station power levels>, <geographic topology>, <antenna orientation> | <no measurement> |
| $A_2$ | 0 | 7 | <base station power levels>, <geographic topology>, <antenna orientation> | <signal strength = 7, UAV, May 10, 2015, 1pm> |

DYNAMIC NAVIGATION OF UAVS USING THREE DIMENSIONAL NETWORK COVERAGE INFORMATION

CROSS-REFERENCE TO RELATED APPLICATION

This application is a continuation of co-pending U.S. patent application Ser. No. 14/741,357, titled "DYNAMIC NAVIGATION OF UAVS USING THREE DIMENSIONAL NETWORK COVERAGE INFORMATION," filed Jun. 16, 2015, the contents of which are incorporated herein in their entirety.

BACKGROUND

"Unmanned Aerial Vehicles" (UAVs) (sometimes referred to as "drones" or Remotely Piloted Aircraft (RPA)) refer to aircraft without a human pilot aboard. The flight of a UAV may be controlled either autonomously (e.g., by onboard and/or remote computers) or by the remote control of a pilot. One proposed use of UAVs is for the delivery of payloads (e.g., packages).

For autonomous operation of a UAV, it can be important that the flight path for the UAV be chosen based on a number of possible restrictions or guidelines. For example, autonomously operating UAVs may be required to fly above approved paths and/or may be required to avoid certain areas (e.g., highly populated areas).

BRIEF DESCRIPTION OF THE DRAWINGS

Embodiments of the present invention will be readily understood by the following detailed description in conjunction with the accompanying drawings. To facilitate this description, like reference numerals may designate like structural elements.

DETAILED DESCRIPTION F PREFERRED EMBODIMENTS

The following detailed description refers to the accompanying drawings. The same reference numbers in different drawings may identify the same or similar elements.

Techniques described herein relate to flight path determination for UAVs. A service may be provided, such as to UAV operators, that generates flight paths for the UAVs. The flight paths may be generated based on the criteria that the UAV should remain connected to a network, such as a wireless cellular network. In one implementation, network coverage for the cellular network may be mapped in a three-dimensional manner. That is, the radio signal strength of the network may be mapped at various heights, associated with a two-dimensional map, that correspond to heights at which UAVs are likely to fly. The three-dimensional signal strength map may be used as a factor in generating UAV flight paths that are optimized to keep the UAV connected to the wireless network.

Figure 1:
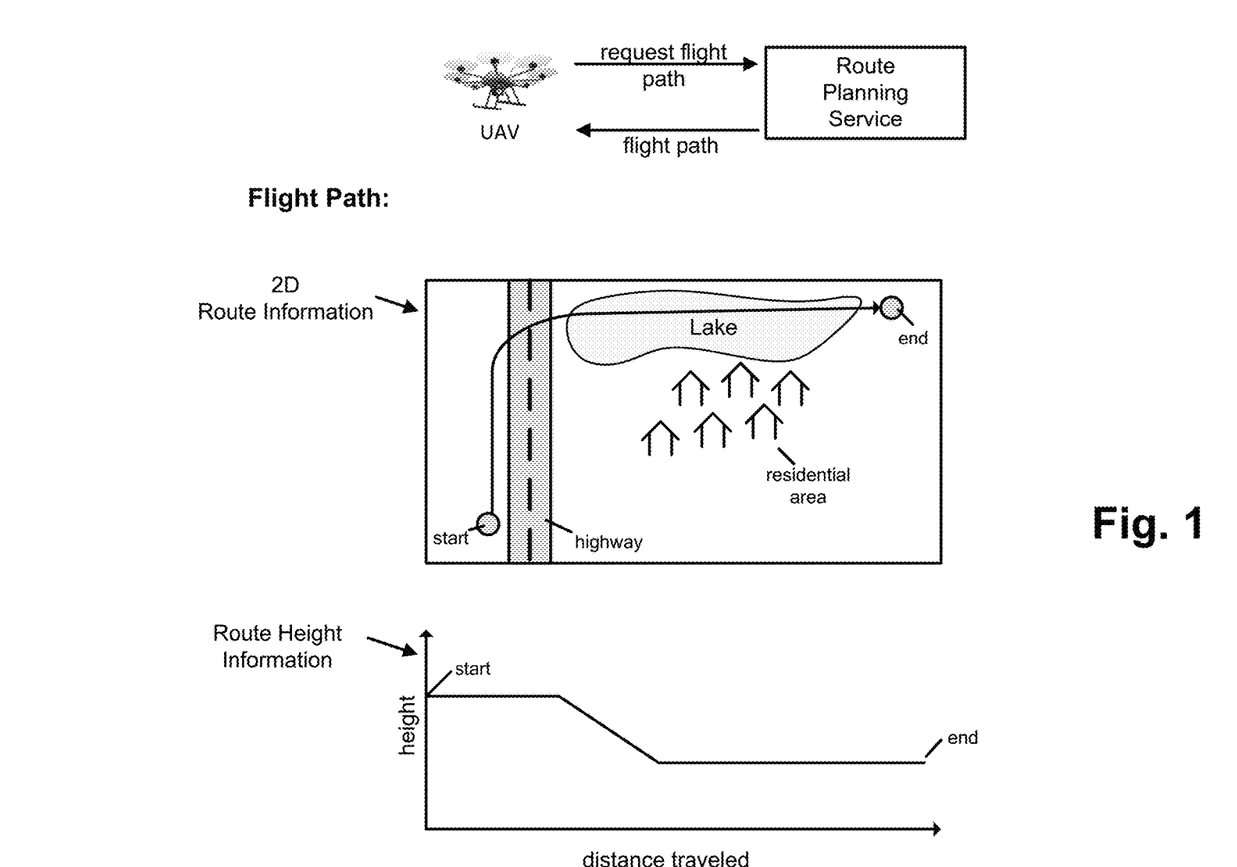
FIG. 1 is a diagram illustrating an example of an overview of concepts described herein.

FIG. 1 is a diagram illustrating an example of an overview of concepts described herein. As shown in FIG. 1, a UAV, or an operator of the UAV, may communicate with a route planning service to obtain flight paths for the UAV. For example, assume that the UAV is to deliver a package to a residence. The UAV may request a route (i.e., a flight path) from the UAV's current location to the destination for the package. The request may thus include an indication of the UAV's beginning location and an indication of the destination (e.g., the beginning location and destination may be specified as geographical coordinates or addresses).

The route planning service may generate one or more appropriate flight paths and transmit the flight path(s) to the UAV. The generated flight path may be optimized based on a number of criteria. For example, the route planning service may take into account local regulations, total distance of the flight path, topographical features, and/or network radio coverage over the flight path. In some implementations, the UAV operator may specify additional criteria or provide weightings of the importance of the various criteria.

The flight path that is generated by the route planning service may include UAV height (altitude) values. The height values may be provided to optimize wireless network coverage, to the UAV, during the course of the flight. For example, if the UAV is permitted to fly between 100 to 400 feet above ground, the flight path may include altitude variations within that range that are calculated to maximize connectivity to the wireless network.

Figure 2:
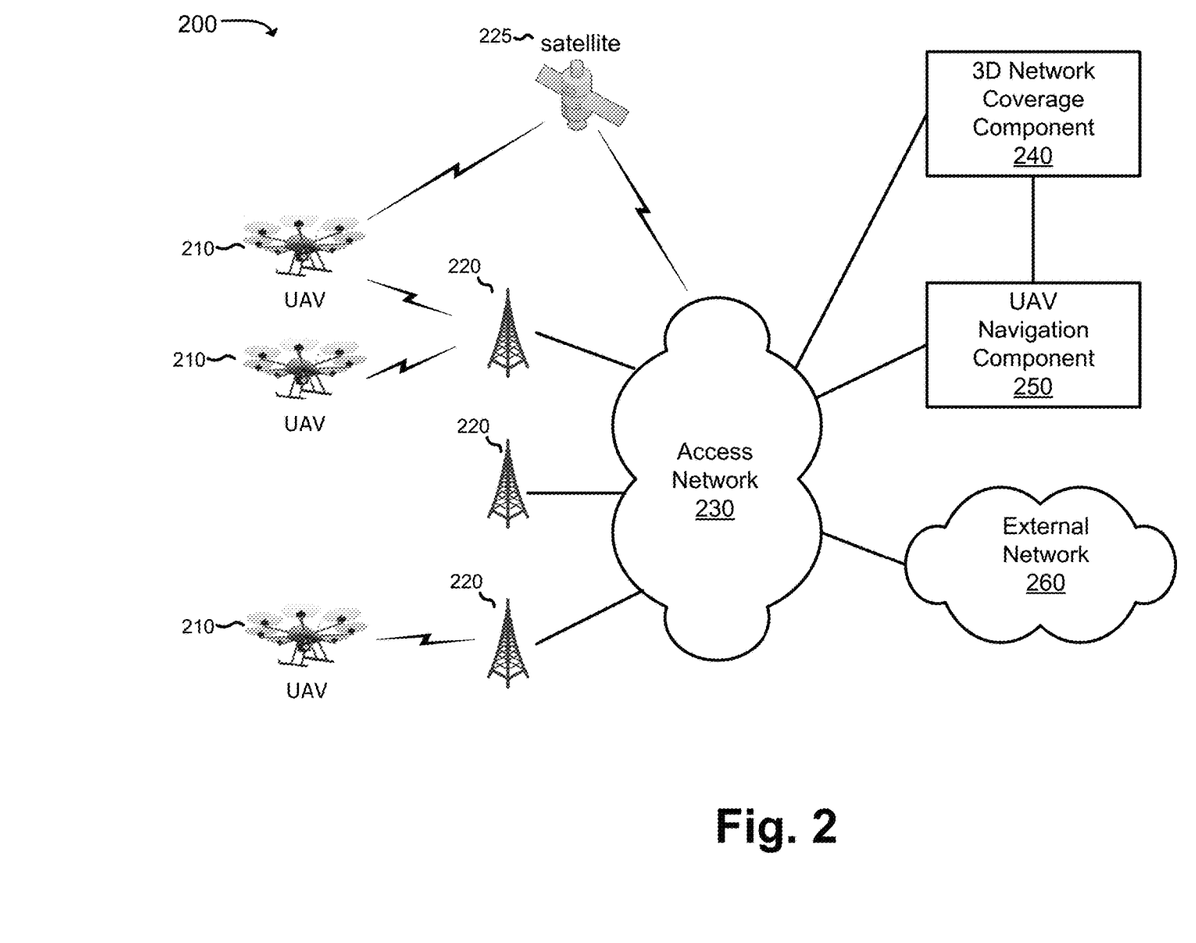
FIG. 2 is a diagram illustrating an example environment in which systems and/or methods described herein may be implemented.

One example flight path is graphically illustrated in FIG. 1 as "2D Route Information" and "Height Route Height Information". As illustrated, by the 2D Route Information, the flight path of a UAV may extend from the location labeled "start" to the location labeled "end." The flight path may be parallel to a highway and fly over a lake, before reaching the destination. The flight path may have been chosen to avoid flying over a residential area, even though the path over the residential area may be the most direct path. As illustrated by the Route Height Information, the flight path may additionally include variations in altitude. As shown, the flight path may start at a relatively high altitude (e.g., 400 feet), may include a transition portion over which the UAV gradually decreases altitude, and a final portion at which the UAV may fly at a lower altitude (e.g., 200 feet). The changes in altitude may be made based on changes in signal strength of the wireless network that is used by the UAV. For example, the signal strength of the wireless network, when the UAV is flying parallel to the highway, may be strong at high altitudes. However, the signal strength of the wireless network, when the UAV is flying over the lake, may be relatively weak at high altitudes and stronger at lower altitudes. Accordingly, the flight path may indicate that the UAV should fly at 400 feet when near the highway and at 200 feet when over the lake FIG. 2 is a diagram illustrating an example environment 200 in which systems and/or methods described herein may be implemented. As shown, environment 200 may include UAVs 210, base stations 220, satellite 225, access network 230, 3D network coverage component 240, UAV navigation component 250, and external network 260.

UAVs 210 may each include a remotely piloted aerial device, such as a quadcopter or other helicopter-based design, a winged flying device, a blimp, etc. Operators of UAVs 210 may include public or private entities that may use UAVs to deliver payloads or to provide other UAV-based services (e.g., landscape monitoring or photography, agricultural services, etc.).

Base stations 220 may include base stations for a wireless cellular network. Each base station 220 may include one or more radio transceivers to provide wireless connections to mobile devices (such as UAVs 210). In the context of a Long Term Evolution (LTE) network, base station 220 may be implemented by an Evolved Node B (eNodeB). In the context of a Global System for Mobile (GSM) communications network, base station 220 may be implemented by a base transceiver station (BTS). Base stations 220 may also include small cells, such as femtocells. Base stations 220 may generally function to provide an air (radio) interface over a large geographical area. Base stations 220 may be geographically arranged to each provide coverage for a limited geographical area (a "cell"). Mobile devices, such as UAVs or smart phones, when moving in and out of the coverage area of particular base stations 220, may be "handed off" to different base stations to receive, from the standpoint of the mobile device, uninterrupted network coverage.

Satellite 225 may represent a communication satellite or network of communication satellites that may be used to provide wireless network connectivity to UAVs 210. Relative to terrestrial network conductivity (e.g., through base stations 220), network connectivity obtained via satellite links may generally include higher latency and lower bandwidth links. Accordingly, satellite 225 may be used as a backup connection for UAVs 210.

Access network 230 may represent a network, such as one implemented by the operator of base stations 220, that is used to connect base stations 220 and to provide network management and backhaul functionality. Access network 230 may also provide connectivity to mobile devices, such as UAVs 210, to external servers or networks, such as to 3D network coverage component 240, UAV navigation component 250, or external network 260.

In an implementation in which the wireless network includes an LTE-based network, access network 230 may include an evolved packet core (EPC) network that operates based on a third generation partnership project (3GPP) wireless communication standard. The EPC network may include one or more serving gateways (SGWs), mobility management entities (MMEs), and/or packet data network gateways (PGWs).

3D network coverage component 240 may include one or more servers or other computer devices used to maintain data structures that map network coverage provided by the wireless network (e.g., provided by base stations 220 and access network 230). The map may be a 3D map that relates geographical areas (e.g., cells or smaller geographical units) to the current signal strength that is estimated as being associated with the geographical area. Within a particular geographical area, the wireless signal strength may vary at different altitudes. 3D network coverage component 240 may track signal strength as a function of altitude and geographical location (e.g., latitude and longitude coordinates). In one implementation, for network coverage relating to UAV navigation, 3D network coverage component 240 may track network coverage between approximately 100 and 400 feet above the ground. For example, for a particular geographical area, 3D network coverage component 240 may maintain an estimate of the current network signal strength at 100 feet, at 200 feet, at 300 feet, and at 400 feet.

In one implementation, 3D network coverage component 240 may be implemented by the operator of the wireless network. 3D network coverage component 240 may be implemented as part of access network 230 or external to access network 230.

UAV navigation component 250 may include one or more servers or other computer devices that are used to provide flight paths to UAVs 210 and/or to operators of UAVs 210. For example, UAV navigation component 250 may provide the flight paths as a service for which the UAV operators pay a monthly fee or pay on a per-flight path basis. An Application Programming Interface (API) may be provided to allow for programmatic access to UAV navigation component 250.

UAV navigation component 250 may obtain network coverage information, from 3D network coverage component 240, to use in generating the flight paths. Other information, such as topographical maps, street maps, other types of maps, national or local regulations, UAV operator preferences, and/or other information may also be used when generating the flight paths. Based on the network coverage information and based on the other information, UAV navigation component 250 may generate flight paths for UAVs 210. The flight paths may be generated to ideally be the shortest path to the UAV's destination, but also taking into consideration the desire for UAVs 210 to be in continuous coverage of the wireless network and to take into account other factors, such as no-fly zones due to regulation or pedestrian concerns. A flight path may be generated as, for example, a sequence of three-dimensional geographic coordinate points ("waypoints") that can be used by UAV 210 to navigate to a location.

Although 3D network coverage component 240 and UAV navigation component 250 are illustrated as two separate components, in some implementations, 3D network coverage component 240 and UAV navigation component 250 may be implemented as a single component (e.g., as a single service or server).

External network 260 may include a wide area network (WAN), a metropolitan area network (MAN), the Internet, a fiber optic-based network, and/or a combination of these or other types of networks. External network 260 may be a packet-based network, such as the Internet. UAV operators may use UAV services, such as the flight path services provided by UAV navigation component 250, through external network 260.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3A:
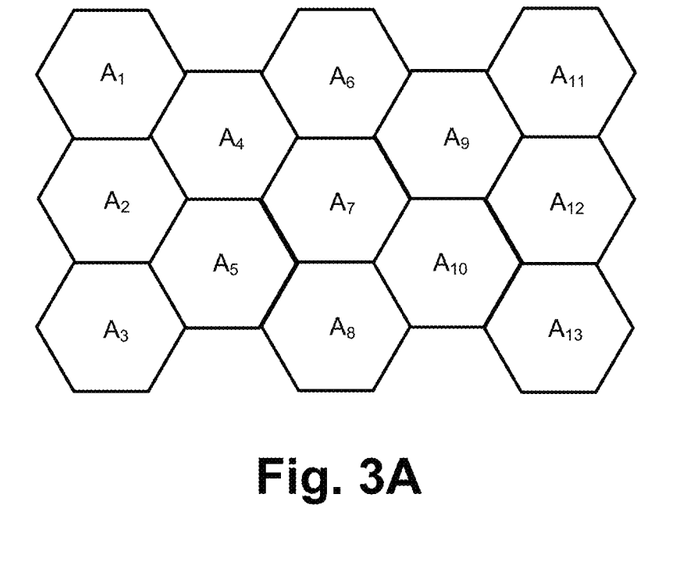
FIGS. 3A and 3B are diagrams illustrating coverage maps relating to estimated signal strength, in three dimensions, corresponding to a wireless cellular network.
Figure 3B:
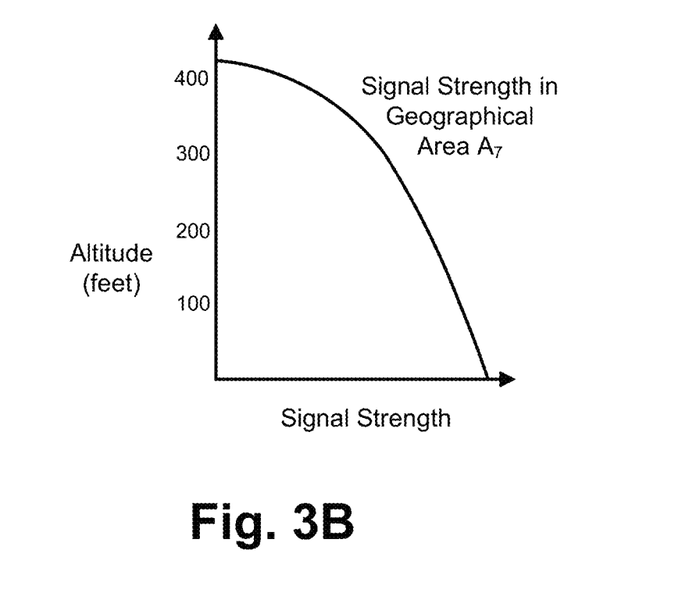

FIGS. 3A and 3B are diagrams illustrating coverage maps relating to estimated signal strength, in three dimensions, corresponding to a wireless cellular network. The coverage maps illustrated in FIGS. 3A and 3B may be maintained by 3D network coverage component 240.

As shown in FIG. 3A, the coverage map may include a two-dimensional component that may map the estimated signal strength associated with particular geographical areas.

The signal strength information may relate to estimated downlink signal strength (e.g., the quality of the radio signal that is transmitted by a base station 220 and received by a UAV 210 (or other device)). Alternatively or additionally, the signal strength information may relate to estimated uplink signal strength (e.g., a measurement of the ability of UAV 210 (or other wireless device) to transmit information to a base station 220). The geographical areas are illustrated in FIG. 3A as hexagons. In other implementations, the coverage map may be implemented using other shapes (e.g., circles or polygons) or using irregular geographical areas (i.e., different geographical areas may be defined as having different sizes or shapes). Additionally, the area corresponding to each of the geographical areas may be chosen by a network operator (or other entity) based on factors such as: the required accuracy of the signal strength estimates, the ability to measure/determine the signal strength estimates, the expected density of devices in a particular area, etc.

In FIG. 3A, 13 geographical areas, labeled as areas A1 though A13, are illustrated. Within a particular geographical area, 3D network coverage component 240 may maintain a signal strength estimate that varies based on the altitude. FIG. 3B is a diagram illustrating an example of variation in signal strength with respect to altitude, for a particular geographical area (e.g., area $A_7$). As shown, in this example, the signal strength may be relatively low at approximately 400 feet and may increase as the altitude decreases. Although the variation in signal strength versus height is illustrated in FIG. 3B as a smooth curve, in some implementations, 3D network coverage component 240 may store the estimates of signal strength, within a particular geographical area, at a limited number of discrete altitudes (e.g., at ground level, 100 feet, 200 feet, 300 feet, and 400 feet).

Signal strength, within a particular geographical area, may, for a number of reasons, vary as a function of altitude. For instance, antennas associated with base stations 220 may include directional antennas that may conventionally be positioned to maximize wireless coverage for ground-level mobile phones that are used by human operators. Thus, for example, a UAV 210 that is flying directly over a base station 220 may experience poor signal strength even though a mobile phone on the ground (i.e., in use by a user that is positioned below base station 220) may experience good signal strength. Examples of factors that can lead to variations in signal strength, both as a function of the location on the ground and or/as a function of height, may include: the type and/or operating conditions of a base station 220, lateral and vertical distance from the base station, buildings and/or natural topography, density of other mobile devices in the area, and/or radio interference from external sources.

Figure 4:
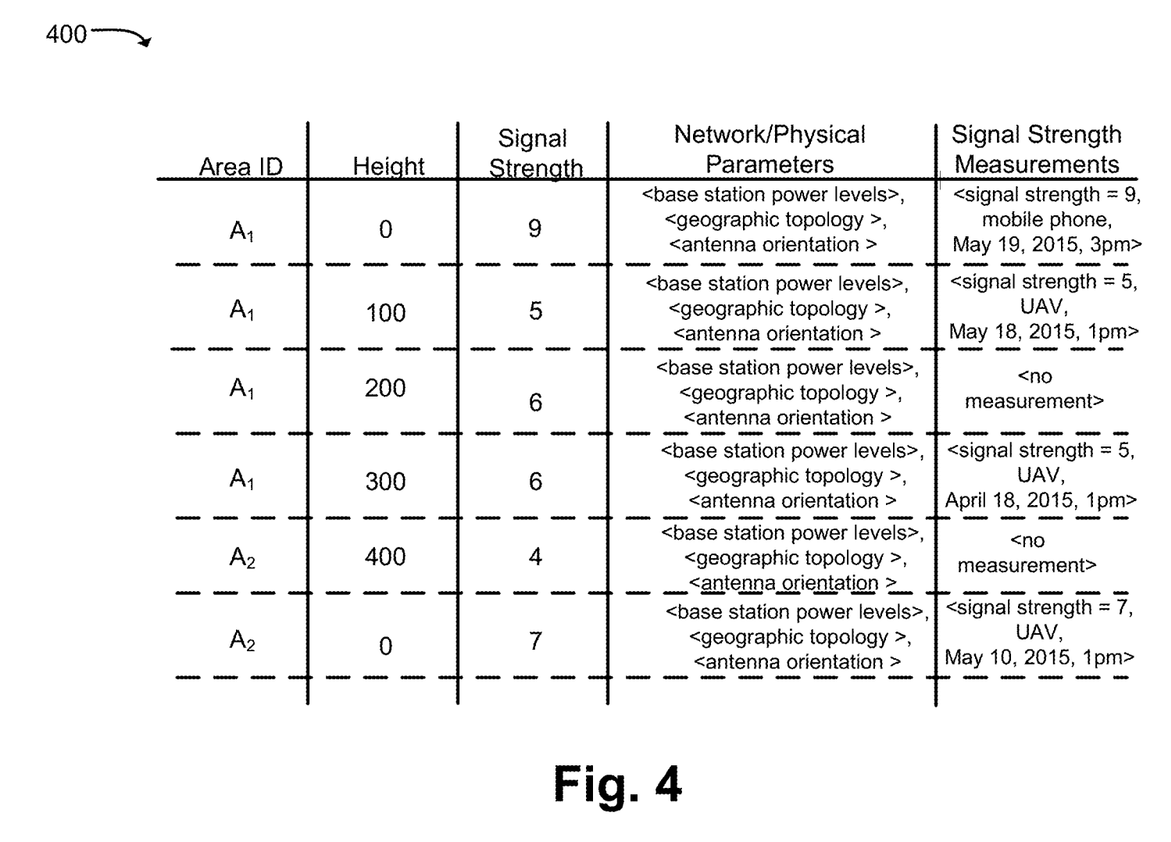
FIG. 4 is a diagram illustrating an example data structure that may be maintained by a 3D network coverage component.

FIG. 4 is a diagram illustrating an example data structure 400, such as a data structure that may be maintained by 3D network coverage component 240. Data structure 400 may be used to store the network coverage information and/or to store parameters or other information that they be used to obtain the network coverage information.

As illustrated, data structure 400 may include a number of fields, including: an area identifier (ID) field, a height (altitude) field, a signal strength field, a network\physical parameters field, and a signal strength measurements field. Each record in data structure 400, corresponding to one set of the fields, may hold information relating to a signal strength estimate for a particular geographical area and at a particular height. The fields shown for data structure 400 are examples. In alternative possible implementations, different, fewer, or additional fields may be implemented.

The area ID field may store an identifier, such as a label, geographic coordinate (e.g., a set of latitude and longitude coordinates), a set of geographic coordinates that define or describe a geographical region, or other identifier, that is used to identify a particular geographical area. As shown in the example of data structure 400, the area IDs may correspond to the geographical areas of the two-dimensional coverage map illustrated in FIG. 3A. The height field may define the height (e.g., above ground level) of a particular signal strength measurement. The area ID field and the height field may collectively define the three-dimensional location of a particular signal strength measurement or estimate.

The signal strength field may include the signal strength measurement or estimate for the geographical area and height identified in the corresponding area ID and height fields. 3D network coverage component 240 may determine the value for the signal strength field using a number of possible techniques. For example, in one implementation, the signal strength value may be directly measured, such as by a field technician, remote measurement equipment, and/or by UAVs (or other devices) that are attached to the wireless network. For example, UAVs 210, when flying to a destination, may measure the signal strength that is experienced by the UAV, at a particular three-dimensional location, and transmit an indication of the signal strength (corresponding to the three-dimensional location of UAV) to 3D network coverage component 240 or UAV navigation component 250. These signal strength measurements may be collected by 3D network coverage component 240. In some implementations, instead of or in addition to directly measuring signal strength, 3D network coverage component 240 may estimate signal strength, at various three-dimensional locations, based on knowledge of geographic topology, network topology, and/or configured network parameters. For example, an estimate of the signal strength may be calculated for a particular base station (e.g., based on the three-dimensional distance from the antenna of base station). The estimate may be based on, for example, the orientation of the antenna, the transmission power of the transmitter, the type/model of antenna or base station, local geographic topology, the height of the antenna, and/or other factors.

In the example of data structure 400, the signal strength is indicated as a value between zero (weakest signal strength) and 10 (strongest signal strength). It can be appreciated that, in general, signal strength can be stored using other frameworks or values. For example, in one implementation, signal strength may be categorized as "good," "average," "poor," or "none."

The network/physical parameters field may include information, for the corresponding geographical area and height, that may be used in estimate the signal strength. As previously mentioned, the network/physical parameters may include geographic topology, orientation of the antenna of a base station, etc. In the example of FIG. 4, for geographical area $A_1$ and height zero, data structure 400 may store, in the network/physical parameters field, information relating to current power levels of a base station that is serving $A_1$, the geographic topology of $A_1$, and the antenna orientations of the antennas that are near $A_1$.

The signal strength measurements field may correspond to signal strength measurements taken by devices in the corresponding geographical area and height. For example, as previously mentioned, a UAV that is using the navigational services provided by UAV navigation component 250, may, at various times, measure the network signal strength that is being experienced by the UAV. The UAV may transmit the measured value, along with an indication of three-dimensional location of the UAV, to UAV navigation component 250 and/or 3D network coverage component 240. These values may be stored by 3D network coverage component 240 and used to replace or enhance the value stored in the signal strength field. For example, in one implementation, the most recent measurement of signal strength, when available, may be stored in the signal strength field. When no measurement of signal strength is available, the stored signal strength value can be estimated from the network/physical parameters and/or from the signal strengths corresponding to nearby (e.g., in height or in two-dimensional distance) geographical areas.

As shown in data structure 400, each signal strength measurement may be associated with the measured signal strength value and an indication of the measuring device and the measurement date/time. For example, for geographical area $A_1$ and height zero, data structure 400 indicates that a signal strength measurement of 9 was recorded on May 19, 2015, at 3 pm, by a mobile phone. Similarly, for geographical area $A_1$ and height 100 feet, data structure 400 indicates that a signal strength measurement of 5 was recorded on May 18, 2015, at 1 pm, by a UAV. For geographical area $A_1$ and height 300 feet, data structure 400 indicates that a signal strength measurement of 5 was recorded on Apr. 18, 2015, at 1 pm, by a UAV, but that the current signal strength estimate for this 3D location is 6. In this situation, the measurement may have been considered to be stale and other factors may have been used to calculate the current signal strength for the 3D location.

Figure 5:
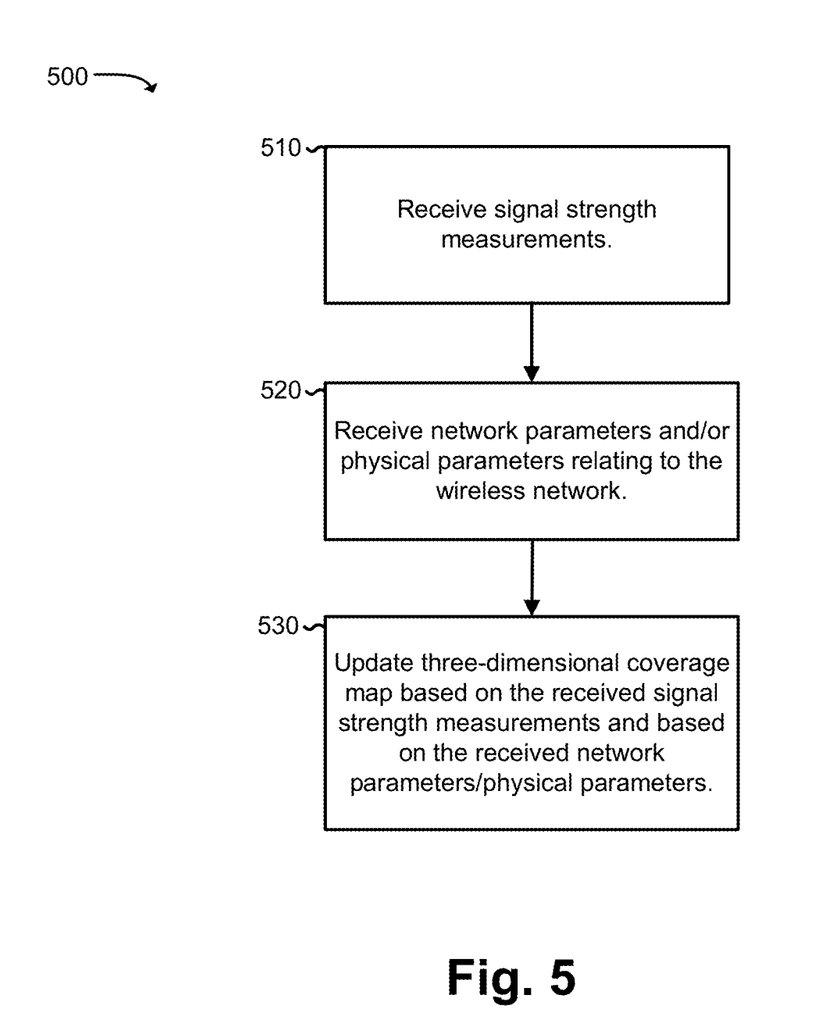
FIG. 5 is a flowchart illustrating an example process relating to the maintaining of a 3D coverage map.

FIG. 5 is a flowchart illustrating an example process 500 relating to the maintaining of a 3D coverage map. Process 500 may be implemented by, for example, 3D network coverage component 240. The term "3D coverage map," as used herein, may refer to a data structure, such as data structure 400, that includes three-dimensional signal strength estimates for a wireless network.

Process 500 may include receiving signal strength measurements (block 510). The signal strength measurements may be based on actual measurements of signal strength that are made by devices associated with the wireless network. The devices may include UAVs 210, other mobile devices (e.g., smart phones carried by users), devices carried by technicians associated with the operator of the wireless network, or dedicated signal strength measurement devices that may be deployed by an operator of the wireless network. The signal strength measurements may include values relating to the uplink or downlink direction (or both). Examples of signal strength metrics include: Received Signal Strength Indicator (RSSI), Received Channel Power Indicator (RCPI), measurements relating to symbol error rates, or other measurements. Each received signal strength measurement may be associated with a three-dimensional location (such as a geographical area label and an altitude). In one implementation, and as previously mentioned, UAVs 210, when flying along a flight path, may transmit signal strength measurements (e.g., to 3D network coverage component 240 or UAV navigation component 250), at various locations on the flight path.

Process 500 may also include receiving network parameters and/or physical parameters relating to the wireless network (block 520). The network parameters and/or physical parameters relating to the wireless network may include network topography information (e.g., the deployment of base stations and antennas associated with the wireless network), landscape topography information, information describing external sources of interference, or other information. In some implementations, operational values relating to the wireless network may also be received. The operational values may include, for example, congestion in the network, current transmission power of base stations 220, beamforming parameters being used by base stations 220, or other values.

Process 500 may further include updating the three-dimensional coverage map based on the received signal strength measurements and based on the received network parameters/physical parameters (block 530). For instance, 3D network coverage component 240 may continuously update the 3D coverage map based on the received information. In one implementation, directly measured values (e.g., as received in block 510) of the received signal strength may be preferentially used to determine the signal strength coverage at a particular three-dimensional location. When a directly measured value is not available or is considered to be stale (i.e., not updated for a certain period of time), 3D network coverage component 240 may estimate the signal strength, at a particular three-dimensional location, based on the network parameters or physical parameters. For example, power radiation formulas may be used to estimate signal strength, at a particular location, due to one or more nearby base stations 220.

Through the operation of process 500, 3D network coverage component 240 may operate to maintain an up-to-date three-dimensional coverage map of the wireless network. 3D network coverage component 240 may make the coverage map available to other network processes or devices. For example, UAV navigation component 250 may query 3D network coverage component 240 to obtain coverage information that UAV navigation component 250 may use to generate flight paths for UAVs 210.

Figure 6:
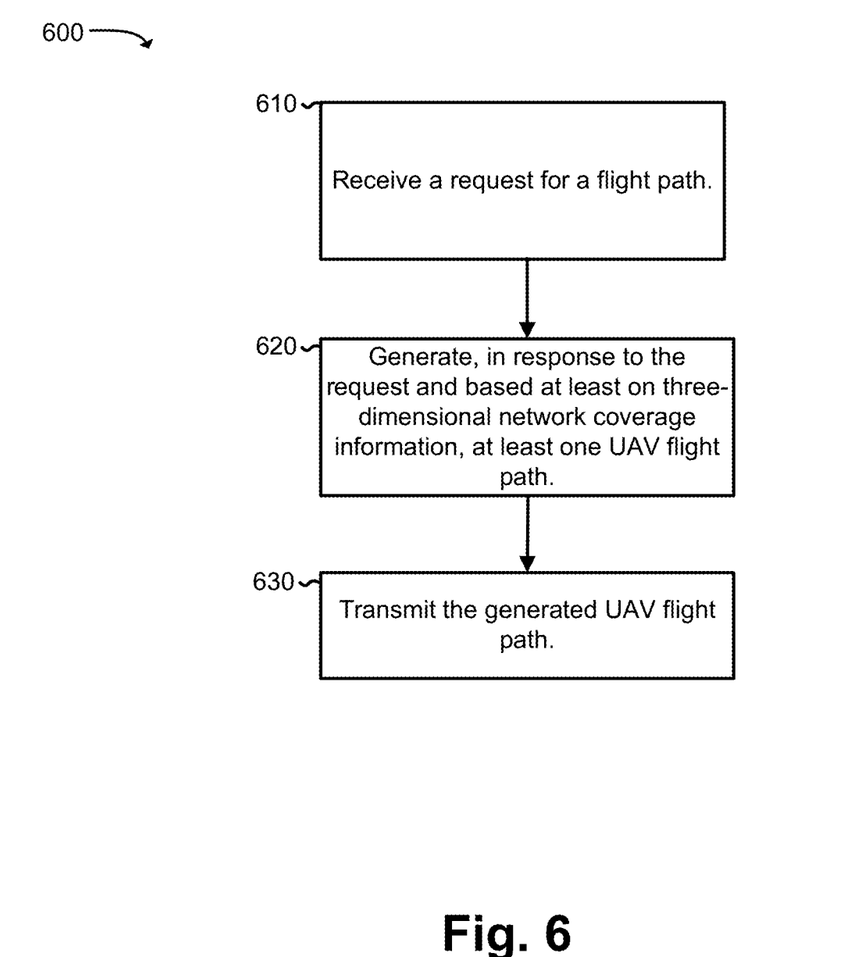
FIG. 6 is a flowchart illustrating an example process relating to the providing of UAV flight paths as a service.

FIG. 6 is a flowchart illustrating an example process 600 relating to the providing of UAV flight paths as a service. Process 600 may be implemented by, for example, UAV navigation component 250.

A request for a flight path may be received (block 610). The request may include a request that is transmitted by UAV 210 (e.g., via a wireless cellular network) or by a device acting on behalf of or in control of UAV 210 (e.g., a pilot, technician, or data center associated with the UAV). In one implementation, UAV navigation component 250 may provide an API or other interface through which flight paths can be automatically requested. The request may include an indication of an intended destination of UAV 210 (e.g., an address, business name, account name, etc.) and a starting point or current location of UAV 210. Alternatively or additionally, the request may include a request for navigational assistance, provided via waypoints, to the intended destination.

Process 600 may further include generating, in response to the request and based at least on three-dimensional network coverage information, at least one flight path (block 620). The flight path may include, for example, a sequence of three-dimensional waypoints that define the flight path. UAV navigation component 250 may offer the entire navigation process of determining an appropriate route, as a service, to UAVs 240. Factors such as regulatory "no-fly" zones, other regulatory UAV rules, maximizing a route to minimize flying over areas of high pedestrian density, or other factors, may be maintained by UAV navigation component 250 and incorporated into the determined UAV paths. Additionally, UAV navigation component 250 may take into account network coverage, and attempt to maximize network coverage along the flight path. Maximizing network coverage may involve varying the altitude of UAV 210 based on the three-dimensional coverage map. UAV navigation component 250 may obtain the three-dimensional coverage map (or a portion of the coverage map) by querying 3D network coverage component 240.

Process 600 may further include transmitting the generated UAV flight path (block 630). For example, UAV navigation component 250 may transmit the flight path to the requesting UAV or other device.

Figure 7:
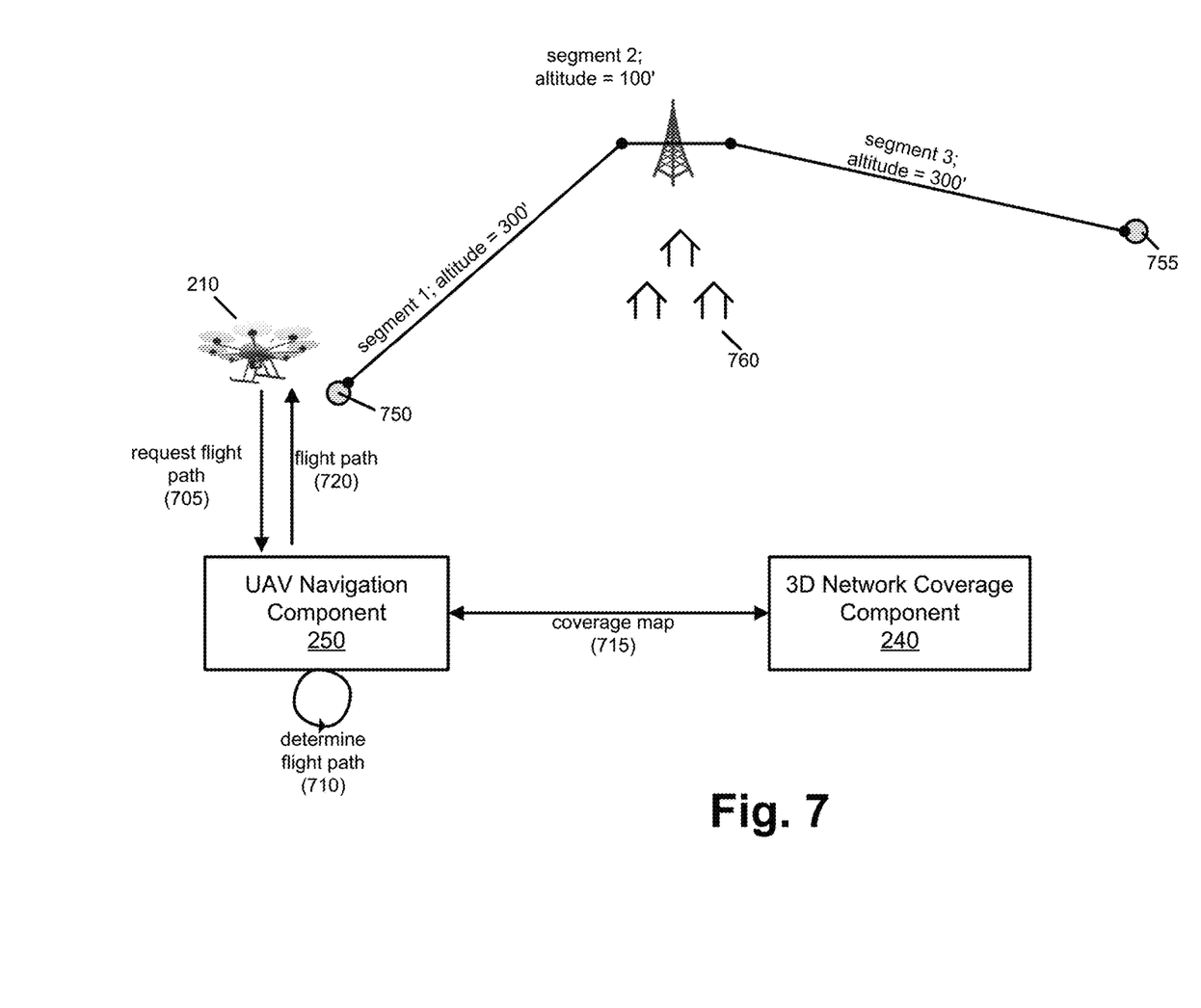
FIG. 7 is a diagram illustrating an example system in which a UAV obtains a flight path from UAV navigation component.

FIG. 7 is a diagram illustrating an example system in which a UAV 210 obtains a flight path from UAV navigation component 250. In FIG. 7, assume UAV 210 is to navigate to a residence to deliver a package. UAV 210 (or an operator associated with UAV 210) may use the services of UAV navigation component 250 to obtain an appropriate flight path from start location 750 to destination 755. In particular, UAV 210 may transmit a request for a flight path to UAV navigation component 250 (at 705, "request flight path"). The request may include an indication of the start and destination of the flight path (e.g., geographical coordinates (e.g., latitude and longitude coordinates) or street address information). In response, UAV navigation component 250 may determine a sequence of waypoints that define the flight path (at 710, "determine flight path"). Each segment of the flight path may be associated with an altitude. As part of the determination of the flight path, UAV navigation component 250 may query 3D network coverage component 240 to determine coverage of the wireless network (at 715, "coverage map") that is used by UAV 210 to remain in contact with a base location associated with UAV 210 (e.g., starting location 750). UAV navigation component 250 may communicate the flight path to UAV 210 (at 720, "flight path").

As previously mentioned, in addition to the destination and the network coverage map, other factors may be used by UAV navigation component 250 in determining the flight path. For example, regulatory rules, minimization of flight over pedestrian areas, or other factors, may also be taken into account by UAV navigation component 250 when determining the flight path.

As shown, in the example of FIG. 7, assume the flight path is determined as including three segments. A first segment (segment 1) is to be flown at an altitude of approximately 300 feet. At the end of segment 1, assume that, due to proximity to a base station, network coverage may be poor at high altitudes. Accordingly, the second segment (segment 2) is to be flown at an altitude of approximately 100 feet. The third segment may take UAV 210 to destination 755. The third segment (segment 3) is to be flown at an altitude of approximately 300 feet. As is also illustrated in FIG. 7, the flight path causes UAV 210 to avoid residential area 760.

During the flight of UAV 210, assume that the signal strength of the wireless network changes in a particular area. For example, assume that 3D network coverage component 240 and/or UAV navigation component 250 determine that the wireless signal, for segment 3 and at 300 feet has degraded, and that a stronger signal can be found at 100 feet. In some implementations, UAV navigation component 250 may be configured to dynamically transmit flight path update notifications to UAV 210. In this case, the update notification may indicate that UAV 210 should fly at 100 feet for segment 3.

In some situations, the only available or practical flight-path for UAV 210 may be one that takes UAV 210 out of a network coverage area for a particular period. For example, in FIG. 7, assume that segment 3 is a flight path segment in which connectivity to the terrestrial wireless network is not available. In this situation, UAV 210 may navigate without connectivity to a base or UAV 210 may use a backup network link, such as a backup link provided by a satellite network.

Figure 8:
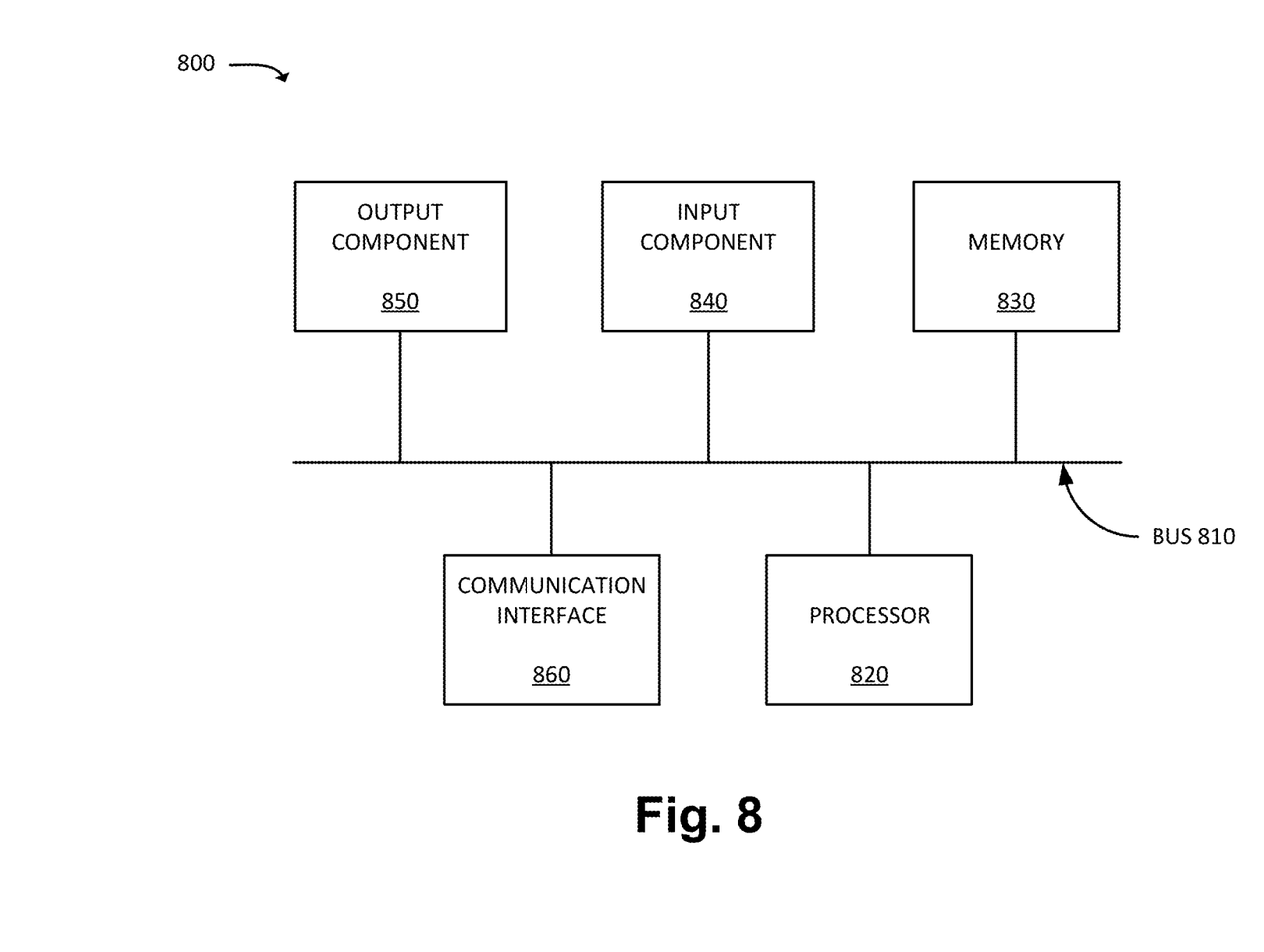
FIG. 8 is a diagram of example components of a device.

FIG. 8 is a diagram of example components of device 800. One or more of the devices described above (e.g., with respect to FIGS. 1, 2, and/or 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may include processing circuitry to interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 5 and 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    maintaining, by one or more computing devices, a three-dimensional network coverage map that includes, for each of a plurality of locations, an indication of wireless signal strength for a wireless network, each of the plurality of locations being three-dimensional locations that are defined as including a height value at which unmanned aerial vehicles (UAVs) are likely to fly, the indications of the wireless signal strengths being obtained using:
        signal strength estimation techniques based on locations of base stations, orientations of antennas respectively associated with the base stations, and geographic topology around the base stations, and
        measuring devices to measure wireless signal strengths at various altitudes;
    determining, by the one or more computing devices, a flight path, for a UAV, based on the three-dimensional network coverage map, the determined flight path indicating three-dimensional altitudes at which the UAV should fly to optimize connectivity to the cellular wireless network when the UAV is traversing the flight path; and
    transmitting, by the one or more computing devices, the determined flight path to an entity associated with navigation of the UAV.

2. The method of claim 1, wherein the determined flight path optimizes connectivity to the wireless network for heights between 100 and 400 above ground level.

3. The method of claim 1, wherein the measurement devices include other UAVs.

4. The method of claim 1, wherein the indications of the wireless signal strengths are further obtained using signal strength estimation techniques that are based on power radiation formulas applied to transceivers in the wireless network.

5. The method of claim 1, wherein the determined flight path includes indications of flight segments, along the flight path, at which network connectivity to the wireless network is not present.

6. The method of claim 1, wherein the signal strength estimation techniques are further performed based on transmission power of transmitters of the base stations.

7. The method of claim 1, further comprising:
    dynamically updating flight altitudes associated with the determined flight path based on changes in the three-dimensional network coverage map; and
    transmitting the updated flight altitudes to the entity associated with navigation of the UAV.

8. The method of claim 1, wherein wireless signal strengths include a Received Signal Strength Indicator (RSSI) value.

9. A computing device including:
    a non-transitory computer-readable medium containing program instructions; and
    processing circuitry to execute the program instructions to:
        maintain a three-dimensional network coverage map that includes, for each of a plurality of locations, an indication of wireless signal strength for a wireless network, each of the plurality of locations being three-dimensional locations that are defined as including a height value at which unmanned aerial vehicles (UAVs) are likely to fly, the indications of the wireless signal strengths being obtained using at least:
        signal strength estimation techniques based on locations of base stations, orientations of antennas respectively associated with the base stations, and geographic topology around the base stations, and
        measuring devices to measure wireless signal strengths at various altitudes;
        determine a flight path, for a UAV, based on the three-dimensional network coverage map, the determined flight path indicating three-dimensional altitudes at which the UAV should fly to optimize connectivity to the wireless network when the UAV is traversing the flight path; and transmit the determined flight path to an entity associated with navigation of the UAV.

10. The computing device of claim 9, wherein the determined flight path optimizes connectivity to the wireless network for heights between 100 and 400 above ground level.

11. The computing device of claim 9, wherein the measurement devices include other UAVs.

12. The computing device of claim 9 wherein the indications of the wireless signal strengths are further obtained using signal strength estimation techniques that are based on power radiation formulas applied to transceivers in the wireless network.

13. The computing device of claim 9, wherein the determined flight path includes indications of flight segments, along the flight path, at which network connectivity to the wireless network is not present.

14. The computing device of claim 9, wherein the signal strength estimation techniques are further performed based on transmission power of transmitters of the base stations.

15. The computing device of claim 9, wherein the processing circuitry is to execute the program instructions to:
dynamically updating flight altitudes associated with the determined flight path based on changes in the three-dimensional network coverage map; and
transmit the updated flight altitudes to the entity associated with navigation of the UAV.

16. A non-transitory computer-readable medium containing program instructions for causing one or more processors to:
maintain a three-dimensional network coverage map that includes, for each of a plurality of locations, an indication of wireless signal strength for a wireless network, each of the plurality of locations being three-dimensional locations that are defined as including a height value at which unmanned aerial vehicles (UAVs) are likely to fly, the indications of the wireless signal strengths being obtained using at least:
signal strength estimation techniques based on locations of base stations, orientations of antennas respectively associated with the base stations, and geographic topology around the base stations, and
measuring devices to measure wireless signal strengths at various altitudes;
determine a flight path, for a UAV, based on the three-dimensional network coverage map, the determined flight path indicating three-dimensional altitudes at which the UAV should fly to optimize connectivity to the wireless network when the UAV is traversing the flight path; and
transmit the determined flight path to an entity associated with navigation of the UAV.

17. The non-transitory computer-readable medium of claim 16, wherein the determined flight path optimizes connectivity to the wireless network for heights between 100 and 400 above ground level.

18. The non-transitory computer-readable medium of claim 16, wherein the indications of the wireless signal strengths are further obtained using signal strength estimation techniques that are based on power radiation formulas applied to transceivers in the wireless network.

19. The non-transitory computer-readable medium of claim 16, wherein the signal strength estimation techniques are further performed based on transmission power of transmitters of the base stations.

20. The non-transitory computer-readable medium of claim 16, wherein the program instructions further cause the one or more processors to:
dynamically updating flight altitudes associated with the determined flight path based on changes in the three-dimensional network coverage map; and
transmitting the updated flight altitudes to the entity associated with navigation of the UAV.

* * * * *